INVENTORS
Peter R. Leavitt
Bernard Vonnegut 3,215,997
CORONA CURRENT SENSING DEVICE
Peter R. Leavitt, Allston, and Bernard Vonnegut, Weston, Mass., assignors to Arthur D. Little, Inc., Cambridge, Mass., a corporation of Massachusetts
Filed Mar. 13, 1963, Ser. No. 264,800
8 Claims. (Cl. 340—253)

This invention relates to apparatus for detecting electrical charges in the atmosphere and for giving an alert or warning when such charges exceed a predetermined value.

When a thunderstorm forms overhead, the first indication of cloud electrification is the appearance of increasing negative potential gradients. This phenomenon can be sensed, and the indication of high gradients of either polarity used to provide an alert. For this purpose standard equipment such as potential gradient measuring devices is available. However, such devices require that the insulation between the elevated metal point and the ground be better than $10^{11}$ ohms. In this range of required impedance, even spider webs and high humidities can inactivate the measuring device unless considerable attention is paid to the maintenance of its insulation.

In accordance with the present invention, it is possible to provide an alert or warning with relatively simple equipment requiring much less attention and maintenance than the more sophisticated instruments presently available. Thus, the elevated metal point and its connecting wiring need to be isolated from the ground by as little as 100 megohms, so that ordinary insulation is adequate. If this resistance is less than about 100 megohms, more than half the signal current will be lost; this lower limit is determined by the leakage allowable at the required operating potential. The upper limit of resistance, however, is not important; it can be any higher figure or even infinite.

Since an electrical current of one microampere or more will flow into the atmosphere from elevated, exposed, grounded conducting points whenever potential gradients slightly exceeding fair weather values are developed, this current can be sensed and used as the basis for providing an alert or warning. A simple form of equipment requiring a minimum of attention and maintenance is provided for this purpose in accordance with the present invention.

This invention will now be described in detail in connection with the accompanying drawings, which are to be considered as illustrative and not as limiting, and wherein.

Figure 1:
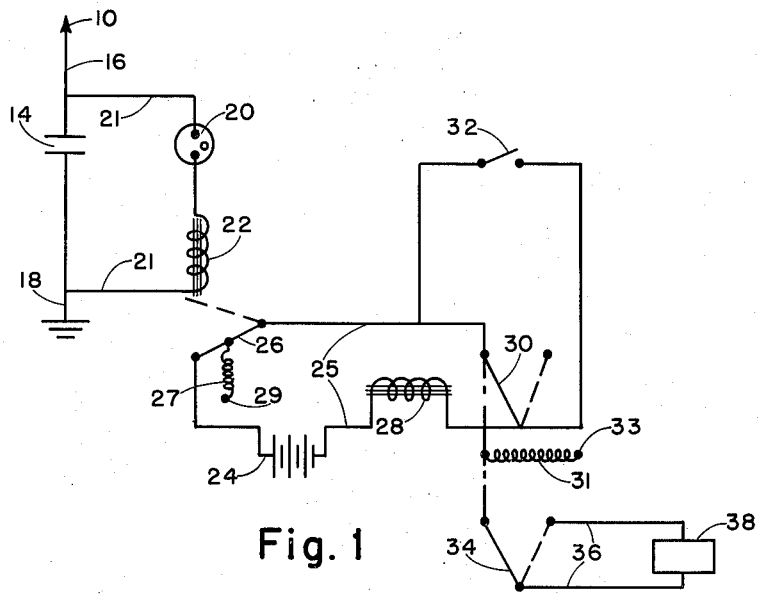
FIG. 1 is a schematic showing of a simple form of arrangement of the apparatus of this invention.

Referring to FIG. 1: the elevated metal point 10 is exposed on a mast 12 (see FIG. 3) and is connected to a capacitor 14 by an insulated wire 16. This capacitor is grounded by connection 18. A neon lamp 20 and coil 22 in series therewith are connected across the capacitor 14. Coil 22 and switch 26 form the relay referred to herein as the "sensitive relay." Neon lamp 20 is a type which has no contained resistor. An amplifying system is provided consisting of battery 24, switch 26 and coil 28 of another relay in a circuit which is closed by arm 30 of a double-pole, double-throw switch, in the position shown by the solid line. Switch 26 is biased to the position shown by the solid line by means of spring 27 attached to a suitable support at 29. A normally open manual reset switch 32 is placed across switch 30. The other pole 34 of the double-pole, double-throw switch is normally in the position shown by the solid line. When it moves to the position shown by the dotted line it completes the circuit through lines 36 to warning system 38 which may comprise one or more lights or audible alarms or other signals together with batteries or other electrical power required to operate them.

In the absence of a high potential gradient in the atmosphere, the switches 26, 30 and 34 will be in the position shown. The current flowing through relay circuit 25 activates the core or magnet in coil 28 thereby maintaining switch 30, 34 in the "latched" position shown. On the occurrence of a sufficiently high atmospheric electrical potential gradient, such as 10 or 15 volts per cm., the capacitor 14 is gradually charged with up to 20 microcoulombs until a potential of about 80 volts is attained. At this time the neon lamp 20 becomes conductive and the capacitor 14 discharges through the lamp and coil 22. The core of coil 22 thereupon becomes magnetized and opens switch 26, thereby opening circuit 25 momentarily. Switch 30, which is spring loaded by means of spring 31 attached to a fixed support at 33, consequently opens and similarly switch 34 closes circuit 36 thereby setting off the alert 38.

In order to put the system back into condition for detecting subsequent high potential gradients the normally open reset switch 32 is closed either manually or by an external circuit, thereby sending current from battery 24 through circuit 25 and energizing the magnet in coil 28 whereby switch 30 is moved to close the circuit and switch 34 simultaneously is opened and the alert 38 is deactivated. Switch 26 has closed by action of the relay return spring 27 in a fraction of a second after it opened, inasmuch as the discharge through lamp 20 and coil 22 is merely momentary and switch 26 is biased to closed position by the spring.

Reset switch 32 may be reset automatically by the use of time delay relays operating from the alarm circuit or from other convenient power source.

A charge of about 20 microcoulombs is necessary to operate this device. The corona current from the point 10 can supply this amount in about 20 seconds or less after the point discharge commences. Thereafter as the gradient increases the next pulses occur in less time. Under an electrical storm the discharge pulses may occur every three or four seconds, or even more frequently.

No power is required for this system except that needed for battery 24 and for actuating the alert 38. This apparatus can in fact be used as an alert signal upon the failure of power by observing the flashing of neon bulb 20.

Figure 2:
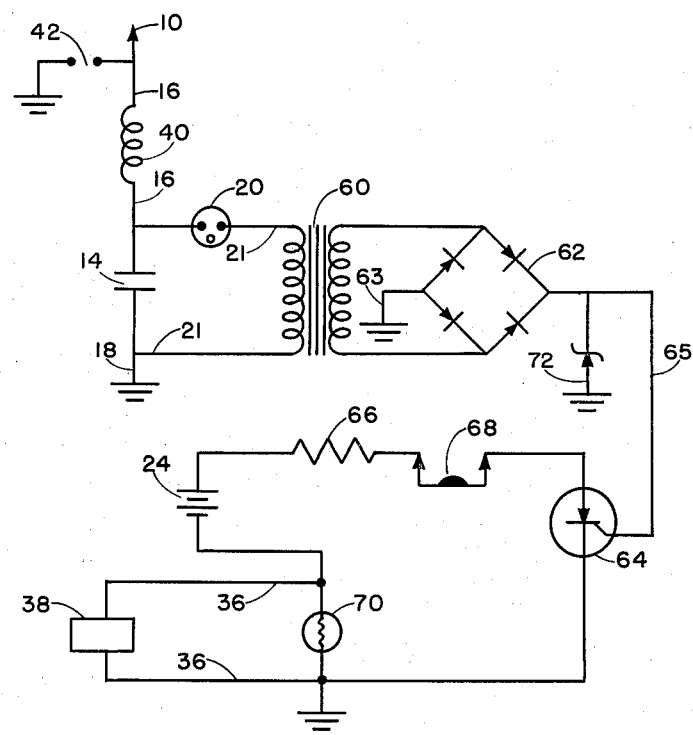
FIG. 2 shows a modification of the apparatus which eliminates the inherent vibration susceptibility of the sensitive relay shown in FIG. 1.

The device shown in FIG. 2 eliminates the inherent vibration susceptibility of the arrangement of FIG. 1. In the latter, jarring or vibration may cause switch 26 to open momentarily thereby setting off the warning system. Hence, if any substantial amount of jarring or vibration is likely to be present, the arrangement of FIG. 2 is preferable to that of FIG. 1, as the former device has no moving parts.

In the device shown in FIG. 2, the sensitive relay of FIG. 1 has been replaced by a transformer 60, a rectifier bridge 62, and a silicon controlled rectifier 64, and associated circuitry. Rectifier 64 is in circuit with power source 24 and warning means 38 (in circuit 36), as in FIG. 1; also with resistance 66 and reset button 68.

The rectifier 64 becomes conducting when a pulse of positive polarity is placed on the control gate and it stays conducting until the current through it is discontinued. Inasmuch as the polarity of the current flowing through lamp 20 may be positive or negative, it is necessary to provide means between circuit 21 and rectifier 64 to assure a current surge of the desired polarity through rectifier 64. This is accomplished by providing the transformer 60 and the rectifier bridge 62. The latter as shown contains a diode in each of the four legs, and is grounded at 63. Wire 65 leading to rectifier 64 is also grounded at 72.

Upon ocurrence of about 20 microcoulombs of discharge from point 10, a surge of current occurs through circuit 21 and a pulse of the appropriate polarity is transmitted via bridge 62 and wire 65 to rectifier 64, which thereupon becomes conducting. Current from power source 24 therefore flows through the circuit, activating the alert or warning means 38 in circuit 36 and lighting the lamp 70, which latter is referred to in more detail below. Resistance 66 is placed in circuit with power source 24 and rectifier 64 to prevent short circuiting of the power source when the rectifier becomes conductive. The power source may for example be a 6–12 volt battery, and the resistance a 3-ohm, 50-watt resistor.

As soon as the alert has been activated, the circuit is reset by pushing the reset button 68, thereby opening the circuit and interrupting the current. Rectifier 64 thereupon ceases to be conductive. It remains non-conductive, upon releasing the reset button, until the next pulse of current is delivered to it through wire 65.

In either form of this apparatus, or modifications thereof, a lightning arrester may be provided to protect the current detecting instrument and the structure on which it is mounted. This arrester, as shown in FIG. 2, consists of a choke coil 40 in the lead-in wire 16 and a spark gap 42 in parallel therewith and connected to ground. The spark gap 42 is suitably covered in conventional fashion to prevent damage or shorting or other change in its electrical characteristics.

The alert or warning system may comprise lamp 70, or in fact lamp 70 may constitute the entire warning system, if desired. It is also evident that in the system of FIG. 2 no separate power source is required for the alert means 38 (and 70, if used), inasmuch as it is actuated by the power from source 24 when rectifier 64 becomes conductive.

The silicon-controlled rectifier 64 can be irreparably damaged if excession potentials are applied to its control gate. As surges of high potentials are to be expected in this apparatus whenever there is a nearby lightning stroke, a limiting diode 72 is provided between wire 65 and ground. Whenever surges in excess of some predetermined value appear at the output of bridge 62, the limiting diode 72 becomes partially conductive and diverts the excess of the signal pulse to ground without interfering with the function of the silicon-controlled rectifier 64. The diode 72 for example may be set to shunt to ground the portions of surges in excess of 7 volts.

Rectifier bridge 62 may be provided with germanium diodes, one on each leg, as shown. Capacitor 14 (FIGS. 1 and 2) may conveniently be a 0.25 microfarad 400 volt capacitor. Reset button 68 may be set either manually or by a delay circuit operating from a controlled relay, in conventional manner—as also described in connection with reset switch 32.

Figure 3:
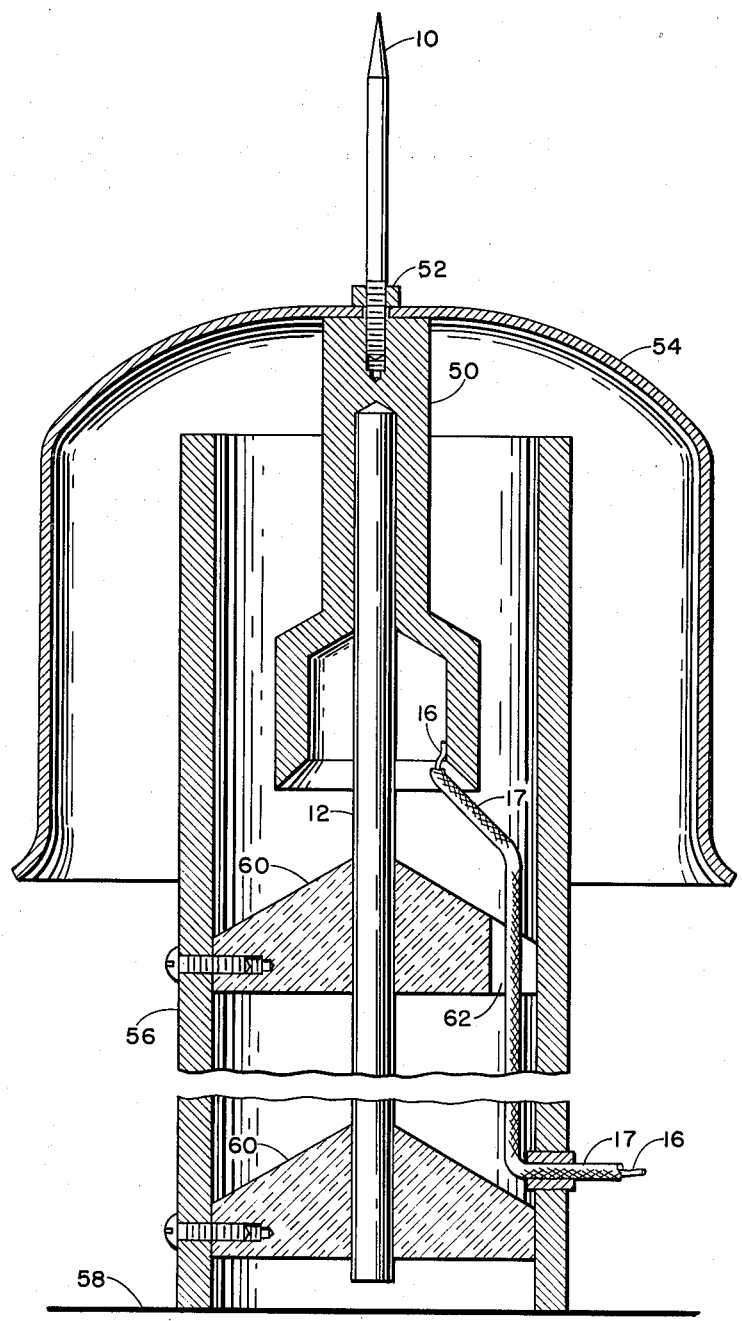
FIG. 3 shows the arrangement of the elevated metal point and its connections to the apparatus of FIGS. 1 and 2.

The point 10 and its mounting are shown in FIG. 3. The point must be very sharp and must be mounted above any surrounding objects. It must be insulated from the ground by at least 100 megohms. The arrangement shown in FIG. 3 will accomplish this degree of insulation, although any other satisfactory arrangement for insulating the point from the ground may be used. As shown in FIG. 3 the point consists of a metal rod, e.g. of stainless steel, sharpened at its point and preferably 2 to 4 millimeters in diameter. The point advantageously forms an angle of about 5 degrees. The rod is mounted in a conductive cap 50 which is supported on a non-conducting mast 12 which may, for example, be made of glass fibers and polyester resin and is preferably at least a meter in length. A steel skirt 54 is supported by cap 50 and clamped thereto by nut 52. The purpose of skirt 54 is to aid in keeping a portion of mast 12 dry for preservation of its insulation without maintenance. Mast 12 is preferably surrounded and supported by a stainless steel mast 56 resting on the ground or other support 58 and separated from mast 12 by insulating spacers 60, e.g. of nylon. These spacers are provided with openings 62 through which lead-in wire 16 passes. Wire 16 is fastened to cap 50, as by soldering, thereby completing the circuit from point 10 to the detecting apparatus. The exposed portion of lead-in wire 16 is preferably covered with a weather resistant insulation 17 such as polytetrafluoroethylene in order to protect it from weathering and damage by flexure.

The following tabulation illustrates the operation of the device of this invention before, during, and after a thunderstorm.

*Table I*

| Time (EST) | Atmospheric Electric Instrument Indications | U.S.A.F. Weather Observations |
|---|---|---|
| 1510 | | Lower clouds approaching, visibility 15 miles. |
| 1522 | Corona current detector commenced operation and continued until 1650 EST showing that electrified clouds were nearby. | |
| 1534 | First lightning detected from storm by Pierce-type lightning detector of positive gradient changes. | Thunder heard to west. Storm moving northeast. 10 mile visibility. |
| 1538 | Second discharge detected | |
| 1543 | Third discharge detected | Thunder heard, occasional in-cloud lightning reported. |
| 1547 | Discharges become frequent. | 10 mile visibility. |
| 1555 | Frequent discharges occurring. | Rain shower & mile visibility. |
| 1623 | Frequent discharges cease. | |
| 1630 | | Rain shower. |
| 1650 | Corona current flow ceases. | |

We claim:

1. Apparatus for detecting electric charge in the atmosphere symptomatic of stormy weather by sensing the electric current that flows from exposed points on the earth under the influence of atmospheric charge, comprising:
    (a) an exposed electrically conducting point,
    (b) a capacitor,
    (c) a conductor leading from said point to said capacitor, and from said capacitor to ground,
    (d) a sensor connected across said capacitor, and adapted to provide an electrical pulse output by discharging said capacitor when said capacitor becomes charged to a preset value, and
    (e) amplifying means actuated by said electrical pulse to provide a warning signal.

2. Apparatus according to claim 1 wherein said sensor comprises a neon lamp and a coil, in series.

3. Apparatus for detecting electric charge in the atmosphere, comprising:
    (a) an electrically conductive rod vertically mounted on an insulating mast and terminating at a sharp point at the top,
    (b) said point being at an elevation above surrounding objects,
    (c) a capacitor,
    (d) a conductor leading from said point to said capacitor and from said capacitor to the ground,
    (e) a neon lamp and a first coil, in series, connected in parallel with said capacitor, and
    (f) amplifying means responsive to the passage of current through said coil for activating a warning means,
    (g) said point being isolated from the ground by a resistance having a minimum value of about 100 megohms,
    (h) said lamp having no resistor.

4. Apparatus according to claim 3 further comprising:
(a) a first circuit comprising in series
  (i) a source current,
  (ii) a second coil magnetizable on the passage of said current therethrough,
  (iii) a first switch biased to a closed position and being positioned adjacent to said first coil and actuable thereby to open position upon the passage of current through said first coil, and
  (iv) a second switch biased to open position and being positioned adjacent said second coil and actuatable thereby to closed position upon the passage of current through said second coil,
(b) a second circuit comprising in series
  (i) a warning means, and
  (ii) a third switch biased to closed position, said third switch constituting with said second switch a double-pole double-throw switch whereby it is actuated to open position upon the closing of said second swith, and
(c) a third circuit comprising in series a fourth switch and being connected across said second switch whereby said second switch is bypassed upon closing said fourth switch.

5. Apparatus according to claim 3 further comprising:
(a) a transformer, one coil of which is said first coil,
(b) a rectifier bridge connected across the other coil of said transformer,
(c) a silicon-controlled rectifier connected to the output of said bridge, and
(d) a circuit containing in series said rectifier, said warning means, a source of electric power, and means for breaking said circuit.

6. Apparatus according to claim 3 wherein said point comprises a conductive rod about 2 to 4 millimeters in diameter and with a point at its top having an angle of about 5 degrees.

7. Apparatus according to claim 3 wherein said capacitor is of about 0.25 microfarad capacity.

8. Apparatus according to claim 5, wherein said circuit containing said rectifier also contains a limiting diode adapted to divert excess signal pulse in said circuit to ground.

References Cited by the Examiner

UNITED STATES PATENTS

| | | | |
|---|---|---|---|
| 414,943 | 11/89 | Dewey | 174—3 XR |
| 2,086,913 | 7/37 | Kelly | 315—241 XR |
| 2,200,233 | 5/40 | Whitehead | 340—253 XR |
| 2,820,892 | 1/58 | Spangler | 340—310 XR |
| 2,856,563 | 10/58 | Rively | 315—241 XR |
| 2,899,562 | 8/59 | Fruengel | 315—241 XR |

FOREIGN PATENTS 917,382　2/63　Great Britain.

NEIL C. READ, *Primary Examiner.*